United States Patent
Bennett

(10) Patent No.: US 6,381,988 B1
(45) Date of Patent: May 7, 2002

(54) LIQUID COOLING DEFLECTORS IN A GLASSWARE FORMING SYSTEM

(75) Inventor: Stanley Bennett, Nashport, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/921,366

(22) Filed: Aug. 2, 2001

Related U.S. Application Data

(62) Division of application No. 09/747,803, filed on Dec. 22, 2000, now Pat. No. 6,318,130.

(51) Int. Cl.$^7$ ................................................. C03B 7/14
(52) U.S. Cl. ...................... 65/303; 65/29.19; 65/29.21; 65/127; 65/128; 65/162; 65/304; 65/207; 65/208; 65/225; 65/319; 65/355; 65/356
(58) Field of Search ........................... 65/29.19, 29.21, 65/128, 127, 162, 207, 208, 225, 303, 304, 319, 355, 356

(56) References Cited

U.S. PATENT DOCUMENTS

| 1,199,108 A | 9/1916 | Peiler |
| 1,638,593 A | 8/1927 | Mulholland |
| 3,198,616 A | 8/1965 | Havens |
| 3,340,038 A | 9/1967 | Hartman |
| 3,372,017 A | 3/1968 | Pitbladdo |
| 3,650,723 A | 3/1972 | Wiley |
| 3,721,544 A | 3/1973 | Bystrianyk |
| 3,732,916 A | 5/1973 | Cope |
| 3,775,083 A | 11/1973 | Nebelung et al. |
| 3,988,139 A | 10/1976 | Goodwin |
| 4,104,046 A | 8/1978 | McCreery |
| 4,313,751 A | 2/1982 | Torok |
| 4,362,544 A | 12/1982 | Mallory |
| 4,460,398 A | 7/1984 | Sasaki |
| 4,529,431 A | 7/1985 | Mumford |
| 4,654,066 A | 3/1987 | Garcia et al. |
| 4,718,933 A | 1/1988 | Suomala et al. |
| 5,656,051 A | 8/1997 | Mares-Benavides |
| 6,038,888 A | 3/2000 | Flynn et al. |
| 6,038,889 A | 3/2000 | Hartman et al. |

*Primary Examiner*—Michael Colaianni

(57) ABSTRACT

A glassware forming machine system includes an individual section glassware forming machine having a plurality of sections, each with at least one blank mold, and a gob distributor for distributing molten glass gobs to the blank molds of each machine section in sequence. The molten glass gobs are delivered to the blank molds of each section through deflectors on which the glass gobs slide to each blank mold. At least one liquid coolant passage is integral with each deflector, and the several coolant passages for the entire machine are connected in parallel between source and return liquid coolant manifolds. Variable flow control valves are individually connected between each liquid coolant passage and the return manifold for controlling flow of liquid coolant through the passages and thereby balance temperatures among the parallel gob deflectors. In this way, all of the gob deflectors are maintained at the same temperature, which improves uniformity of temperature and timing of gob delivery to the blank molds of the several machine sections.

13 Claims, 2 Drawing Sheets

LIQUID COOLING DEFLECTORS IN A GLASSWARE FORMING SYSTEM

This application is a division of application Ser. No. 09/747,803 filed Dec. 22, 2000 now U.S. Pat. No. 6,318,130.

The present invention is directed to glassware forming systems that form articles of glassware from individual molten glass gobs, and more particularly to a method and apparatus for cooling the deflectors that direct the molten glass gobs into the blank molds at each section of an individual section glassware forming machine.

BACKGROUND AND SUMMARY OF THE INVENTION

The art of manufacturing articles of glassware, such as glass containers, is currently served by the so-called individual section machine. Such a machine includes a plurality of separate or individual manufacturing sections, each of which has a multiplicity of operating mechanisms for converting one or more charges or gobs of molten glass into articles of glassware such as hollow glass containers, and for transferring the containers through the successive stages of the machine section. In general, an individual section glassware forming machine system includes a glass source with a needle mechanism for controlling one or more streams of molten glass, a shear mechanism for cutting the molten glass into individual gobs, and a gob distributor for distributing the individual gobs among the individual machine section. Each machine section includes one or more blank molds and one or more associated deflectors for receiving the gobs and redirecting the gobs to fall by gravity into the associated blank molds, within which each gob is initially formed in a blowing or pressing operation. One or more invert arms transfer the blanks to blow molds in which the articles are blown to final form, tongs remove the formed articles onto a deadplate, and a sweepout mechanism transfers molded glass articles from the deadplate onto a machine conveyor. The conveyor receives containers from all sections of the individual section machine, and conveys the containers to a loader for transfer to an annealing lehr. Operating mechanisms in each section also provide for closure of mold halves, movement of baffles and blow nozzles, control of cooling wind, etc. U.S. Pat. No. 4,362,544 provides a background discussion of the art of both "blow and blow" and "press and blow" glassware forming processes, and discloses an electropneumatic individual section machine adapted for use in either process.

The loading of molten glass gobs into the blank molds of the individual machine sections is a critical stage of system operation. The gob shear mechanism and gob distributor are disposed in fixed position above an individual section machine, and the molten glass gobs are fed by gravity through chutes and troughs to the individual machine sections. The distance of travel of the molten glass gobs to the individual machine sections varies substantially depending upon spacing between the machine sections and the gob distributor. Thus, temperature of the molten glass gobs fed to the blank molds can vary significantly among the machine sections, and indeed among the blank molds of each machine section. Timing of molten glass delivery can also be affected by temperatures of the several paths in the gob distribution system. It is a general object of the present invention to provide a method and apparatus for improving uniformity of gob loading into the blank molds of the several machine sections, and thereby improving the quality and productivity of the overall glassware forming system.

A glassware forming machine system in accordance with a presently preferred embodiment of the invention includes an individual section glassware forming machine having a plurality of sections, each with at least one blank mold, and a gob distributor for distributing molten glass gobs to the blank molds of each machine section in sequence. The molten glass gobs are delivered to the blank molds of each section through channels on which the glass gobs slide to each blank mold. At least one liquid coolant passage is integral with each channel, and the several coolant passages for the entire machine are connected in parallel between source and return liquid coolant manifolds. Variable flow control valves are individually connected between each liquid coolant passage and the return manifold for controlling flow of liquid coolant through the passages and thereby balancing temperatures among the parallel gob channels. In this way, all of the gob flow channels are maintained at the same temperature, which improves uniformity of temperature and timing of gob delivery to the blank molds of the several machine sections regardless of distance between the gob distributor and the machine sections.

In the preferred embodiment of the invention, the several gob delivery channels include gob deflectors disposed in fixed positions adjacent to the blank molds of each machine section for deflecting molten glass gobs into the blank molds. Each such deflector has an associated integral liquid coolant passage. An automatic or manual flow control valve is connected between each deflector coolant passage and the coolant return manifold. Temperature or pressure of liquid coolant is monitored between each deflector coolant passage and the return manifold is monitored, and each automatic or manual valve is controlled so as to maintain constant coolant flow and/or temperature among the several deflectors.

In accordance with another aspect of the present invention, a method of equalizing temperatures among molten glass gobs fed through deflectors to the blank molds at each section of an individual section glassware forming machine contemplates providing a liquid coolant flow passage integral with each deflector, directing liquid coolant through the passages in parallel to draw heat from the deflectors, and controlling coolant flow to maintain the deflectors at identical temperatures. The last step preferably is carried out by measuring pressure or temperature of liquid coolant flowing out of each deflector coolant passage, and controlling flow of coolant through the passages such that the measured pressures or temperatures are the same.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosure of above-noted U.S. Pat. No. 4,362,544 is incorporated herein by reference for purposes of background.

Figure 1:
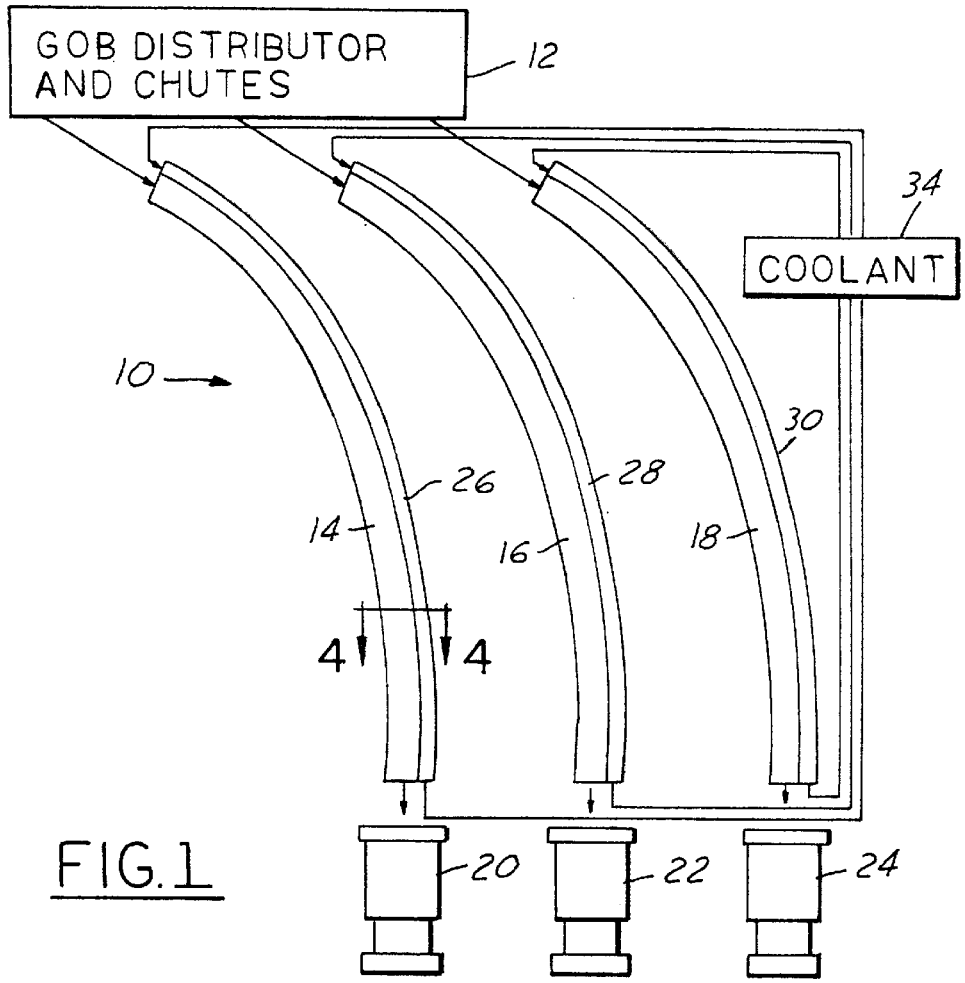
FIG. 1 is a schematic diagram of an individual section machine glassware forming system in accordance with a presently preferred embodiment of the invention.

FIG. 1 illustrates a portion of an individual section machine glassware forming system 10, in which molten glass gobs are fed by a gob distributor and associated chutes 12 through deflectors 14, 16, 18 to associated blank molds 20, 22, 24 of one section of an individual section glassware forming machine. The machine has N sections (FIG. 2) that operate in synchronism with and out of phase with each other to produce glassware. In each machine section, deflectors 14, 16, 18 are disposed in fixed position adjacent to and vertically above associated blank molds 20, 22, 24 for receiving molten glass gobs from the gob distributor and chutes, reorienting the molten glass gobs to vertical orientation, and directing the molten glass gobs to fall by gravity into the associated blank molds. FIG. 1 thus illustrates a so-called triple gob machine, in which each machine section includes three blank molds 20, 22, 24, three blow molds, etc. The principles of the present invention apply equally as well in so-called single, double and quad machines.

Figure 4:
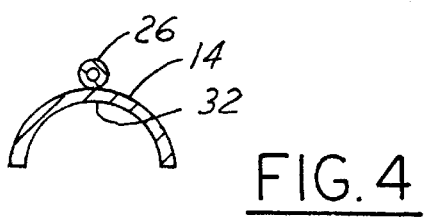
FIG. 4 is a sectional view taken substantially along the line 4—4 in FIG. 1.

Each deflector 14, 16, 18 comprises an elongated curved channel-shaped body (FIG. 4) having a liquid coolant passage 26, 28, 30 coupled to the body for heat-transfer communication with the body. In FIG. 4, coolant passage 26 is illustrated as an elongated conduit or tube externally centrally secured to the channel-shaped body of deflector 14. Tube 26 may be secured to body 14 by any suitable technique for obtaining efficient heat transfer, such as by welding, brazing or clamping tube 26 onto body 14. Alternatively, the body of deflector 14 and coolant passage 26 may be integrally formed in an extruding operation or the like. Thus, as a molten glass gob travels along the undersurface 32 of deflector 14, heat transferred to the body of deflector 14 is withdrawn by coolant directed through passage 26. The same is true for deflectors 16, 18 and associated coolant passages 28, 30 (FIG. 1). In general, coolant passages 26, 28, 30 are connected in parallel to source and return ports of a source 34 of liquid coolant under pressure.

Figure 2:
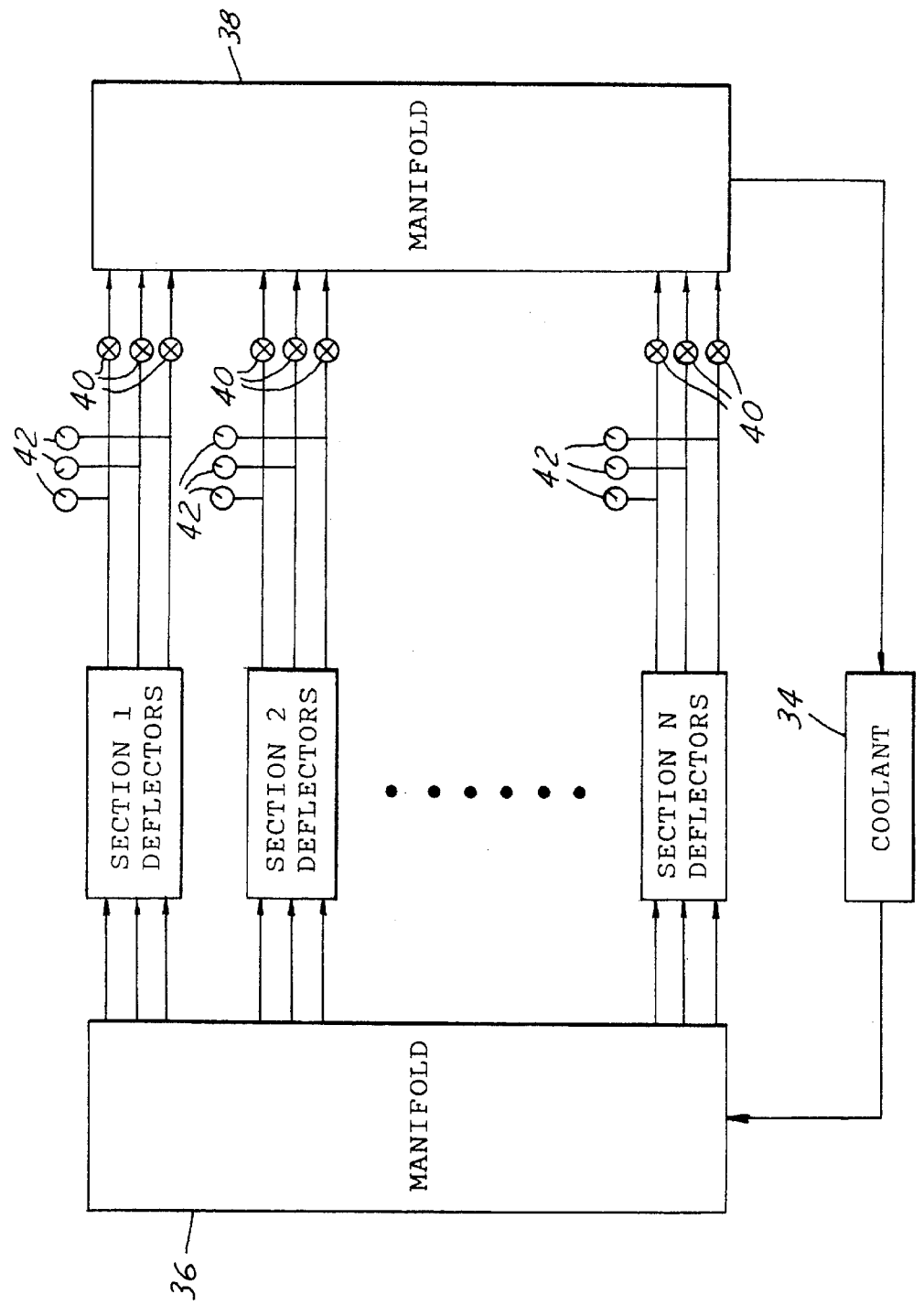
FIG. 2 is a schematic diagram that illustrates coolant delivery in the system of FIG. 1.

FIG. 2 is a schematic diagram that illustrates coolant flow control in system 10 of FIG. 1. The output of coolant source 34 is connected to a coolant source manifold 36, and the return port of coolant source 34 is connected to a coolant return manifold 38. Between source manifold 36 and return manifold 38, the coolant passages of the several deflectors of each machine section are connected in parallel. That is, each coolant passage 26, 28, 30 of each deflector 14, 16, 18 at each machine section has an inlet end connected to source manifold 36, and has an outlet end connected to return manifold 38 through an associated manual valve 40. A pressure gauge 42 is connected between the outlet end of each deflector coolant passage and its associated manual valve 40. Thus, a machine operator may observe the several pressure gauges 42 and adjust associated manual valves 40 so that the back pressures of coolant flowing through all deflector coolant passages of all machine sections are the same or substantially the same. In this way, flows of coolant through the several deflector coolant passages are controlled in parallel so that such coolant flows are the same or substantially the same, and deflector temperatures are the same or substantially the same, regardless of the distance between the deflectors and the gob distributor or the distance between the deflector coolant passages and the manifolds. Deflector temperatures are thus maintained substantially uniform and at greatly reduced level (e.g., over 100° F. less than) conventional air cooled gob deflectors.

Figure 3:
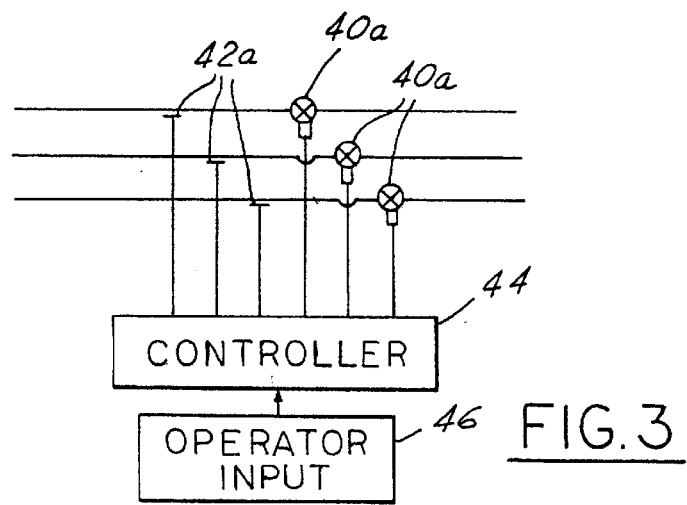
FIG. 3 is a fragmentary schematic diagram that illustrates a modification to the embodiment of FIG. 2.

FIG. 3 illustrates a modification to the coolant flow control system of FIG. 2, in which manual valves 40 are replaced by electronics flow control valves 40a, such as solenoid-operated flow control valves, which receive control signals from an electronic controller 44. Controller 44 receives inputs from sensors 42a responsive to pressure or temperature of the coolant flowing through the associated coolant lines. Controller 44 also receives input from an operator panel 46, for example, by means of which a machine operator can set the temperature or pressure desired in the several coolant lines. Thus, controller 44 is responsive to such operator input, and to the temperature or pressure signals from sensors 42a, for controlling operation of valves 40a and thereby maintaining desired pressure or temperature in coolant flowing through the several parallel deflector coolant passages. Although it is presently envisioned that the pressures and/or temperatures of coolant flowing through the several deflector coolant passages would be maintained substantially the same, it is also possible with the system and method of the present invention to maintain one or more deflectors at higher or lower temperature than the other deflectors, and thereby perhaps compensate for other anomalies in the gob delivery system so as to obtain the desired uniformity of gob loading into the blank molds, which is the result ultimately desired.

There have thus been disclosed an apparatus and method for controlled cooling of gob deflectors in an individual section glassware forming machine system that fully satisfy all of the objects and aims previously set forth. A number of modifications and variations have been disclosed. Other modifications and variations will readily suggest themselves to persons of ordinary skill in the art. The invention is intended to embrace all such modifications and variations as fall within the spirit and broad scope of the appended claims.

What is claimed is:

1. A method of equalizing temperatures among molten glass gobs fed through deflectors to blank molds at each section of an individual section glassware forming machine, which comprises the steps of:

(a) providing a liquid coolant flow passage integral with each deflector, (b) directing liquid coolant through said passages in parallel to draw heat from said deflectors, and (c) controlling said step (b) to maintain said deflectors at identical temperatures.

2. The method set forth in claim 1, wherein said step (c) is carried out by individually controlling flow of liquid coolant through said passages.

3. The method set forth in claim 2 wherein said step (c) is carried out by:

(c1) measuring pressure or temperature of liquid coolant flowing out of each said passage, and (c2) controlling flow of coolant through said passages such that said measured pressures or temperatures are the same.

4. A method of equalizing temperatures among molten glass gobs fed through deflectors to blank molds at each of plural sections of an individual section glassware forming machine, which comprises the steps of:

(a) providing a liquid coolant flow passage integral with each deflector, (b) connecting said liquid coolant flow passages of said plural sections between first and second coolant manifolds such that said passages are connected parallel between said manifolds, (c) directing liquid coolant through said first manifold to said passages in parallel, and thence to said second manifold, and (d) controlling said step (c) to maintain said deflectors at temperatures that are equal to each other.

5. The method set forth in claim 4 wherein said step (d) is carried out by controlling flow of liquid coolant through said passages individually for each said passage.

6. The method set forth in claim 5 wherein said step of controlling flow of liquid coolant through said passages is carried out in response to temperature sensors or pressure measuring means operatively coupled to each said passage and responsive to pressure or temperature of coolant flowing through said passages.

7. The method set forth in claim 6 wherein said step (d) is carried out by controlling a flow control valve associated with each said passage.

8. A method of equalizing temperatures among molten glass gobs fed through deflectors to blank molds at each of plural sections of an individual section glassware forming machine, which comprises the steps of:

(a) providing a liquid coolant flow passage integral with each deflector, (b) connecting each of said liquid coolant flow passages through flow control valves between first and second coolant manifolds such that each said passage is connected in series with an associated flow control valve, and said passages and associated valves are connected in parallel between said manifolds, (c) directing liquid coolant through said first manifold to said passages and valves in parallel, and thence to said second manifold, and (d) controlling said flow control valves to maintain said deflectors at temperatures that are equal to each other.

9. The method set forth in claim 8 wherein said step (d) is carried out manually.

10. The method set forth in claim 8 wherein said step (d) is carried out electronically.

11. The method set forth in claim 8 wherein said step of controlling flow of liquid coolant through said passages is carried out in response to temperature sensors or pressure measuring means operatively coupled to each said passage and responsive to pressure or temperature of coolant flowing through said passages.

12. The method set forth in claim 11 wherein said step (d) is carried out manually.

13. The method set forth in claim 11 wherein said step (d) is carried out electronically.

* * * * *